US010715353B2

(12) United States Patent
Kulkarni et al.

(10) Patent No.: US 10,715,353 B2
(45) Date of Patent: Jul. 14, 2020

(54) VIRTUAL LOCAL AREA NETWORK IDENTIFIERS FOR SERVICE FUNCTION CHAINING FAULT DETECTION AND ISOLATION

(71) Applicant: Ciena Corporation, Hanover, MD (US)

(72) Inventors: Nikhil Sanjeev Kulkarni, San Jose, CA (US); Ankur Saxena, Mountain View, CA (US); Varthamanan Sugumaran, Milpitas, CA (US); Praveen Ambalappat, Milpitas, CA (US); Dhanya Harilal, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 14 days.

(21) Appl. No.: 15/595,066

(22) Filed: May 15, 2017

(65) Prior Publication Data

US 2018/0331856 A1   Nov. 15, 2018

(51) Int. Cl.
*H04L 12/46* (2006.01)
*G06F 9/50* (2006.01)
(Continued)

(52) U.S. Cl.
CPC ........ *H04L 12/4666* (2013.01); *G06F 9/5077* (2013.01); *G06F 11/263* (2013.01);
(Continued)

(58) Field of Classification Search
CPC . H04L 12/4666; H04L 43/50; H04L 41/5012; H04L 41/14; H04L 41/5035;
(Continued)

(56) References Cited

U.S. PATENT DOCUMENTS 8,630,167 B2 * 1/2014 Ashwood Smith ..... H04L 45/00
370/217
9,537,846 B2   1/2017 Jethanandani et al.
(Continued)

FOREIGN PATENT DOCUMENTS

CN   106452930 A   2/2017
WO   2016180181 A1   11/2016

OTHER PUBLICATIONS

J. Halpern et al., Internet Engineering Task Force (IETF), Service Function Chaining (SFC) Architecture, Category: Informational, ISSN: 2070-1721, Oct. 2015, pp. 1-32.

*Primary Examiner* — Feben Haile
(74) *Attorney, Agent, or Firm* — Clements Bernard Walker; Christopher L. Bernard; Lawrence A. Baratta, Jr.

(57) ABSTRACT

Systems and methods of Service Function Chaining (SFC) fault detection and fault isolation include injecting a first frame with a first Virtual Local Area Network (VLAN) Identifier (ID) tag at an input to the SFC, wherein the first VLAN ID is dedicated to fault detection and a plurality of classifiers in the SFC are configured to pass the first frame with the first VLAN ID through the SFC; detecting the first frame with the first VLAN ID tag at an output of the SFC; and determining connectivity of the SFC based on the detecting. The systems and methods can further include injecting a second frame with a second VLAN ID tag through a plurality of services of the SFC; detecting the second frame at each output of each of the plurality of services; and determining a location of the fault based on the detecting the second frame.

17 Claims, 5 Drawing Sheets

(51) Int. Cl.
*G06F 11/263* (2006.01)
*G06F 16/487* (2019.01)
*H04L 12/24* (2006.01)

(52) U.S. Cl.
CPC ........ *G06F 16/487* (2019.01); *H04L 41/0677* (2013.01); *H04L 41/5035* (2013.01); *H04L 41/5038* (2013.01)

(58) Field of Classification Search
CPC ............. H04L 41/5038; H04L 41/0677; G06F 11/263; G06F 9/5077; G06F 17/30041
See application file for complete search history.

(56) References Cited

U.S. PATENT DOCUMENTS

| | | | |
|---|---|---|---|
| 2006/0262728 A1* | 11/2006 | Addeo | H04L 43/00 370/248 |
| 2012/0230325 A1* | 9/2012 | Haddock | H04L 12/4633 370/357 |
| 2012/0263044 A1* | 10/2012 | Akahane | H04L 43/10 370/242 |
| 2014/0321260 A1 | 10/2014 | Mishra et al. | |
| 2015/0092564 A1 | 4/2015 | Aldrin | |
| 2016/0020973 A1 | 1/2016 | Mishra et al. | |
| 2016/0028640 A1* | 1/2016 | Zhang | H04L 45/306 370/389 |
| 2016/0294664 A1 | 10/2016 | Manghirmalani et al. | |
| 2016/0330111 A1 | 11/2016 | Manghirmalani et al. | |
| 2017/0346752 A1* | 11/2017 | Krishnamurthy | H04L 45/306 |
| 2018/0159801 A1* | 6/2018 | Rajan | H04L 49/70 |

\* cited by examiner

… (1)

VIRTUAL LOCAL AREA NETWORK IDENTIFIERS FOR SERVICE FUNCTION CHAINING FAULT DETECTION AND ISOLATION

FIELD OF THE DISCLOSURE

The present disclosure generally relates to networking systems and methods. More particularly, the present disclosure relates to Virtual Local Area Network (VLAN) Identifiers for Service Function Chaining (SFC) fault detection and isolation.

BACKGROUND OF THE DISCLOSURE

Network Functions Virtualization (NFV) is a network architecture concept that uses virtualization to transform entire classes of network node functions into building blocks that may connect, or chain together, to create network services. A Virtualized Network Function (VNF) may include one or more Virtual Machines (VMs) running different software and processes, on top of standard high-volume servers, switches, and storage, or even cloud computing infrastructure, instead of having custom hardware appliances for each network function. For example, a virtual session border controller could be deployed to protect a network without the typical cost and complexity of obtaining and installing physical equipment for that function. Other examples of NFV include virtualized load balancers, firewalls, Domain Name System (DNS) servers, intrusion detection devices, Wide Area Network (WAN) accelerators, routers, and the like. The NFV framework can be conceptualized with three components generally, namely VNFs, Network Functions Virtualization Infrastructure (NFVI), and Network Functions Virtualization Management and Orchestration Architectural framework (NFV-MANO). Again, VNFs are software implementations of network functions that can be deployed on the NFVI. The NFVI is the totality of all hardware and software components that build the environment where VNFs are deployed. The NFVI can span several locations and the network providing connectivity between these locations is considered as part of the NFVI. The NFV-MANO is the collection of all functional blocks, data repositories used by these blocks, and reference points and interfaces through which these functional blocks exchange information for the purpose of managing and orchestrating NFVI and VNFs.

The delivery of end-to-end services often requires various service functions. These include traditional network service functions such as firewalls and traditional IP Network Address Translators (NATs), as well as application-specific functions. The definition and instantiation of an ordered set of service functions and subsequent "steering" of traffic through them are termed Service Function Chaining (SFC) such as described in IETF RFC 7665 "Service Function Chaining (SFC) Architecture" (October 2015), the contents of which is incorporated by reference. The Service Chain Operations, Administration, and Maintenance (OAM) functions refer to the functionality of collecting and analyzing the SFC path status, detecting failures, and establishing a SFC restoration path. SFC OAM includes fault detection (is the SFC path operational) and fault isolation (where is a fault located in the SFC path). SFC OAM is required, but there are no current techniques specified for SFC fault detection and fault isolation. Specifically, there are no mechanisms to address end-to-end fault detection, to identify per hop fault isolation, and no single standard protocol to address OAM across multi-layer Service Functions (SFs).

BRIEF SUMMARY OF THE DISCLOSURE

In an embodiment, a method of Service Function Chaining (SFC) fault detection and fault isolation includes injecting a first frame with a first Virtual Local Area Network (VLAN) Identifier (ID) tag at an input to the SFC, wherein the first VLAN ID is dedicated to fault detection and a plurality of classifiers in the SFC are configured to pass the first frame with the first VLAN ID through the SFC; detecting the first frame with the first VLAN ID tag at an output of the SFC; and determining connectivity of the SFC based on the detecting. The method can further include, responsive to detecting a fault in the connectivity, injecting a second frame with a second VLAN ID tag through a plurality of services of the SFC; detecting the second frame at each output of each of the plurality of services; and determining a location of the fault based on an absence of the detecting the second frame.

The SFC can include a plurality of Flow Points each including one of the plurality of classifiers. The plurality of Flow Points can include a pair of end points at associated end points of the SFC and one or more intermediate points in the SFC. The first VLAN ID tag is not used for regular traffic classification. The determining connectivity can be reported to one of software and a higher layer controller. The SFC can include one or more Virtual Network Functions (VNFs). Each the plurality of classifiers can be configured to pass the first frame through the one or more VNFs.

In another embodiment, a system of Service Function Chaining (SFC) configured for fault detection and fault isolation includes a plurality of services interconnected in the SFC; wherein, to determine connectivity of the SFC, a first frame with a first Virtual Local Area Network (VLAN) Identifier (ID) tag is injected at an input to the SFC, wherein the first VLAN ID is dedicated to fault detection and a plurality of classifiers in the SFC are configured to pass the first frame with the first VLAN ID through the SFC, wherein the first frame with the first VLAN ID tag is detected at an output of the SFC, and wherein the connectivity is determined based on detection of the first frame at the output. To determine a location of a fault in the connectivity, a second frame with a second VLAN ID tag can be injected through a plurality of services of the SFC, and wherein the second frame is detected at each output of each of the plurality of services, and wherein the location of the fault is determined based on lack of detection of the second frame at one of the plurality of services.

The SFC can include a plurality of Flow Points each including one of the plurality of classifiers. The plurality of Flow Points can include a pair of end points at associated end points of the SFC and one or more intermediate points in the SFC. The first VLAN ID tag is not used for regular traffic classification. The determined connectivity can be reported to one of software and a higher layer controller. The SFC can include one or more Virtual Network Functions (VNFs). Each the plurality of classifiers can be configured to pass the first frame through the one or more VNFs.

In a further embodiment, an apparatus for Service Function Chaining (SFC) fault detection and fault isolation includes circuitry configured to inject a first frame with a first Virtual Local Area Network (VLAN) Identifier (ID) tag at an input to the SFC, wherein the first VLAN ID is dedicated to fault detection and a plurality of classifiers in the SFC are configured to pass the first frame with the first VLAN ID through the SFC; circuitry configured to detect the first frame with the first VLAN ID tag at an output of the SFC; and circuitry configured to determine connectivity of the SFC based on the detecting.

The apparatus can further include circuitry configured to inject a second frame with a second VLAN ID tag through a plurality of services of the SFC responsive to detecting a fault in the connectivity; circuitry configured to detect the second frame at each output of each of the plurality of services; and circuitry configured to determine a location of the fault based on lack of detecting the second frame. The SFC can include one or more Virtual Network Functions (VNFs). Each the plurality of classifiers can be configured to pass the first frame through the one or more VNFs.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to Virtual Local Area Network (VLAN) Identifiers for Service Function Chain (SFC) fault detection and isolation. The present disclosure includes systems and methods that utilize reserved, dedicated VLAN IDs for fault detection and fault isolation for SFCs. The VLAN IDs designated for fault detection and fault isolation are not used for regular traffic classification. Advantageously, VLANs are supported by all types of VNFs, devices, etc. so any third-party VNF, device, etc. can support the fault detection and fault isolation propose herein without modification. Specifically, a higher layer controller can be notified of specific VLAN IDs including the designated VLAN IDs for fault detection and fault isolation. In this manner, the fault detection and fault isolation proposed herein can be implemented independently of the type of VNF and without modification. The dedicated VLAN IDs can be referred to as Reserved OAM (ROAM) VLAN IDs, and there can be at least two dedicated VLAN IDs—one for fault detection and one for fault isolation. Advantageously, use of VLAN IDs for fault detection and fault isolation as proposed herein is deployable without new standards, without proprietary implementations, and without modifications to existing VNFs and network devices.

Figure 1:
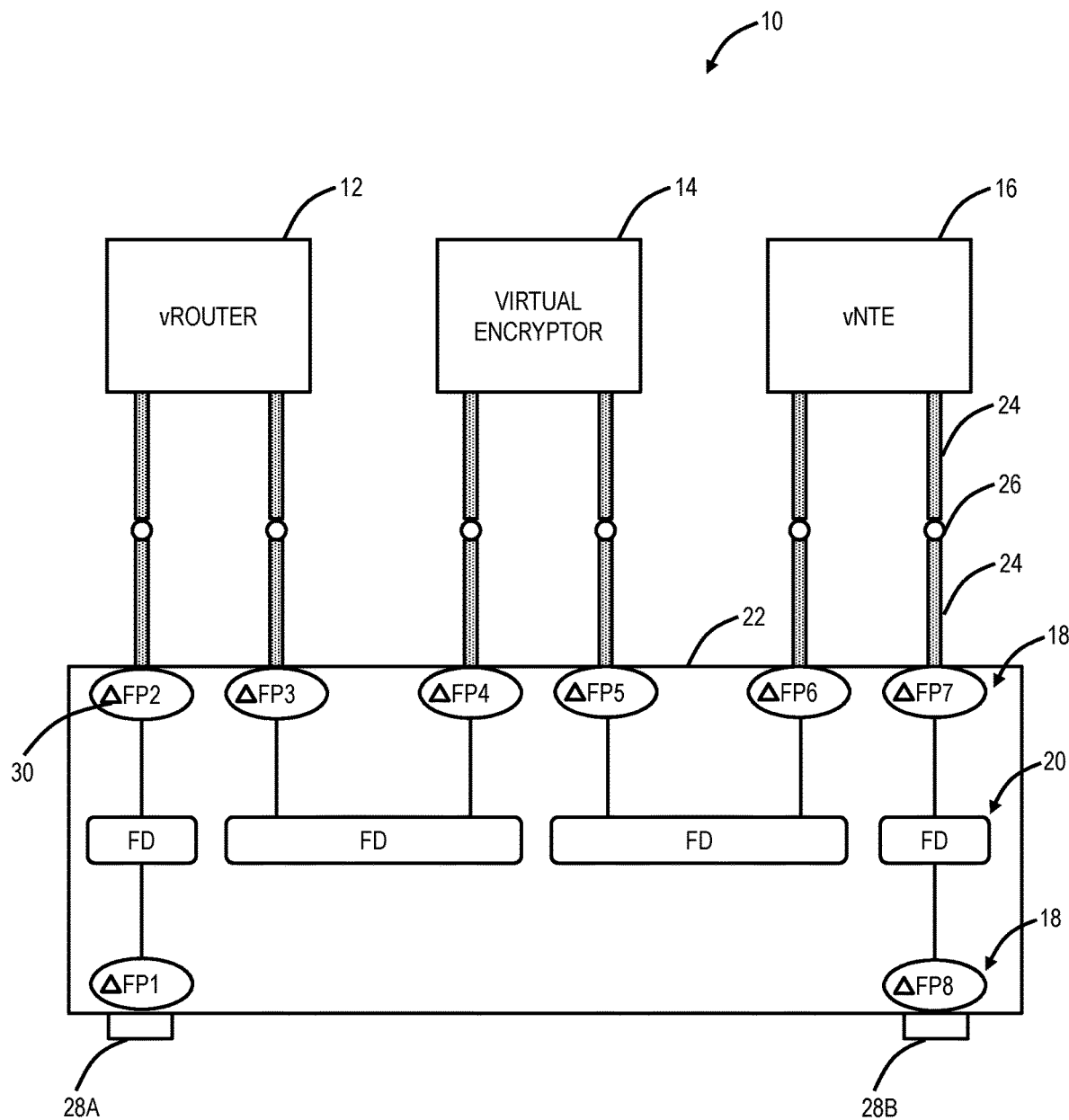
FIG. 1 is a network diagram of a Service Function Chaining (SFC) chain with three examples of Virtualized Network Functions (VNFs) for describing the systems and methods of SFC fault detection and isolation presented herein.

FIG. 1 is a network diagram of an SFC 10 for example with three VNFs 12, 14, 16 for describing the proposed systems and methods of SFC fault detection and isolation. Those skilled in the art will recognize the systems and methods contemplated operation on any SFC chain, and the SFC 10 is presented for illustration purposes only. The VNFs 12, 14, 16 can include a Virtual Router (vRouter) 12, a Virtual Encryptor 14, and a Virtual Network Termination Equipment (vNTE) 16. Of course, application to other types of VNFs, as well as physical devices, is contemplated. The service chain (note, the term service chain can also be used to refer to an SFC) is constructed by creating Flow Points (FPs) 18 (labeled FP1 through FP8) in a Forwarding Domain (FD) 20. The FPs 18 and the FD 20 can be part of a Virtual Switch (vSwitch) 22, in different vSwitches 22, in physical devices, and through a combination thereof. In the case of the vSwitch 22, the VNFs 12, 14, 16 connect to the FPs 18 via tap interfaces 24 and bridges 26. Note, the VNFs 12, 14, 16 can also connect to the FPs 18 via any logical interface in addition to the tap interfaces 24 and bridges 26, e.g., a vHost, etc. In the case of physical devices, the VNFs 12, 14, 16 and other devices can connect to physical interfaces 28. In this example, packets arriving at the FP1 18 associated with a physical interface 28A are intended to traverse multiple hops across the multiple VNFs 12, 14, 16 through the various FPs 18 and are transmitted out via the FP8 18 to/through a physical interface 28B.

One or more service functions can be employed in the delivery of added-value services. A non-exhaustive list of abstract service functions includes: firewalls, Wide Area Network (WAN) and application acceleration, Deep Packet Inspection (DPI), Lawful Intercept (LI), server load balancing, Network Address Translation (NAT), HOST_ID injection, Hyper Text Transfer Protocol (HTTP) Header Enrichment functions, Transmission Control Protocol (TCP) optimizer, routing, switching, encryption, etc.

As a logical component, a service function can be realized as a virtual element (VNF) or be embedded in a physical network element. Service chaining is used to build more complex network services where multiple VNFs are used in sequence to deliver a network service. A network service is an offering provided by an operator that is delivered using one or more Service Functions (SFs). The network service in FIG. 1 can be provided through the VNFs 12, 14, 16 which are each the SFs. An SF is responsible for the specific treatment of received packets. The SF can act at various layers of a protocol stack (e.g., at the network layer or other layers). One or more service functions can be embedded in the same network element. Multiple occurrences of the service function can exist in the same administrative domain.

The SFC 10 defines an ordered set of abstract service functions and ordering constraints that must be applied to packets and/or frames and/or flows selected as a result of classification. An example of an abstract service function is a firewall. The implied order may not be a linear progression as the architecture allows for SFCs that copy to more than one branch, and also allows for cases where there is flexibility in the order in which service functions can be applied. Again, the service functions can be the VNFs 12, 14, 16, other VNFs, and physical network devices. In practical implementations, the service functions can be distributed, i.e., not located on the same physical compute, network, and storage resources.

In the example of FIG. 1, if the link between FP3 18 and FP4 18 is down, typically there is no way to know that the path between the FP1 18 and FP8 18 is broken and the specific link between FP3 18 and FP4 18 is down. In the proposed systems and methods, this issue is addressed using Reserved OAM VLANs. The proposed approach reserves two VLAN IDs—one for fault detection and another for fault isolation. These reserved VLAN IDs are used exclusively for fault detection and fault isolation and not for regular traffic. A higher-level controller can be alerted to the presence of these reserved VLAN IDs at the FPs 18 to correlate their presence (or lack thereof) to fault detection and fault isolation. VLAN Tagging is the practice of inserting a VLAN ID into a packet header in order to identify which VLAN (Virtual Local Area Network) the packet belongs to. More specifically, switches use the VLAN ID to determine which port(s), or interface(s), to send a (broadcast) packet to. Of note, VLAN tagging is well defined and deployed across various different VNFs, physical networking devices, etc.

For example, as described herein, a first VLAN (VLAN #1) (e.g., VLAN ID 500) is reserved for fault detection and a second VLAN (VLAN #2) (e.g., VLAN ID 600) is reserved for fault isolation. The packets tagged with VLANs are identified at classifiers 30 (denoted by triangles at the FPs 18). In SFC, classification is locally instantiated matching of traffic flows against policy for subsequent application of the required set of network service functions and the classification is performed by the classifier.

Figure 2:
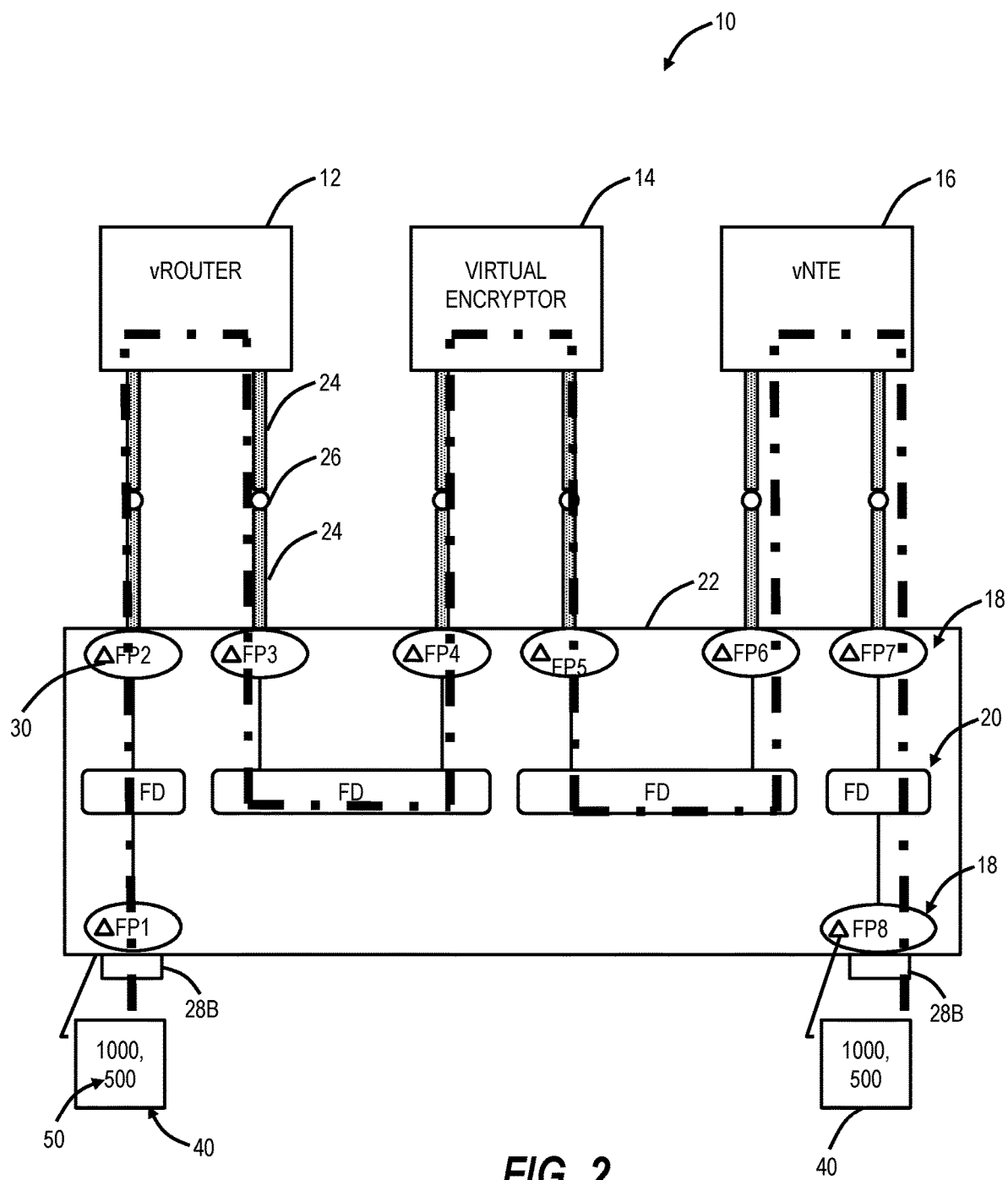
FIG. 2 is a network diagram of the SFC chain of FIG. 1 for describing the systems and methods of SFC fault detection using a first reserved VLAN in accordance with an embodiment of the proposed solution.

FIG. 2 is a network diagram of the SFC 10 for describing the systems and methods of SFC fault detection using a first reserved VLAN. Fault detection is achieved by injecting an Ethernet frame tagged with a ROAM VLAN ID at the FP1 18. The vSwitch 22 recognizes this frame as a service function connectivity check frame and classifies the packet to the next hop (to the FP2 18, etc.). Once the frame is received at the other end FP8 of the SFC 10, the vSwitch 22 informs the software or a higher layer controller that the SFC 10 is operating as expected, i.e., connectivity is verified.

For example, an Ethernet frame 40 with appropriate Layer 2 and/or Layer 3 information with a ROAM VLAN ID 50 is injected at the FP1 18. Assume that VLAN ID 500 is for fault detection and VLAN ID 1000 is for general traffic for the SFC 10. In this example, the Ethernet frame 40 can be double tagged with VLAN ID 1000 and VLAN ID 500. The injected Ethernet frame 40 can have an outer tag on top of the ROAM VLAN ID 50 tag to identify the flow if there is more than one service function chain. In another example, the Ethernet frame 40 can be single tagged with VLAN ID 500. The Ethernet frame 40 is referred to as a service connectivity check frame. Of note, the data contents of the Ethernet frame 40 are irrelevant. The key aspect is the presence of the ROAM VLAN ID 50 which classifies the Ethernet frame 40 as a service connectivity check frame. Also, the Ethernet frame 40 can be prioritized such that the Ethernet frame 40 is not dropped during congestion.

The vSwitch 22 (or other network devices) treats the Ethernet frame 40 with the ROAM VLAN ID 50 as a connectivity check frame and classifies the Ethernet frame 40 for forwarding to the next hop. Similarly, the Ethernet frame 40 gets classified at different FPs 18 along the SFC 10 and finally arrives at FP8 18. Once the Ethernet frame 40 is received at FP8 18, the software or a higher layer controller will be informed that the SFC 10 is operating as expected, namely the Ethernet frame 40 was transmitted at the FP1 18 and received at the FP8 18 verifying the connectivity of the SFC 10. From a terminology perspective, the FP1, FP8 18 can be referred to as endpoints and the FP2, FP3, FP4, FP5, FP6, FP7 can be referred to as intermediate points. The objective of a connectivity check is to verify the Ethernet frame 40 was transmitted between the endpoints, i.e., the FP1, FP8 18 and that SFC 10 is up and operational.

Figure 3:
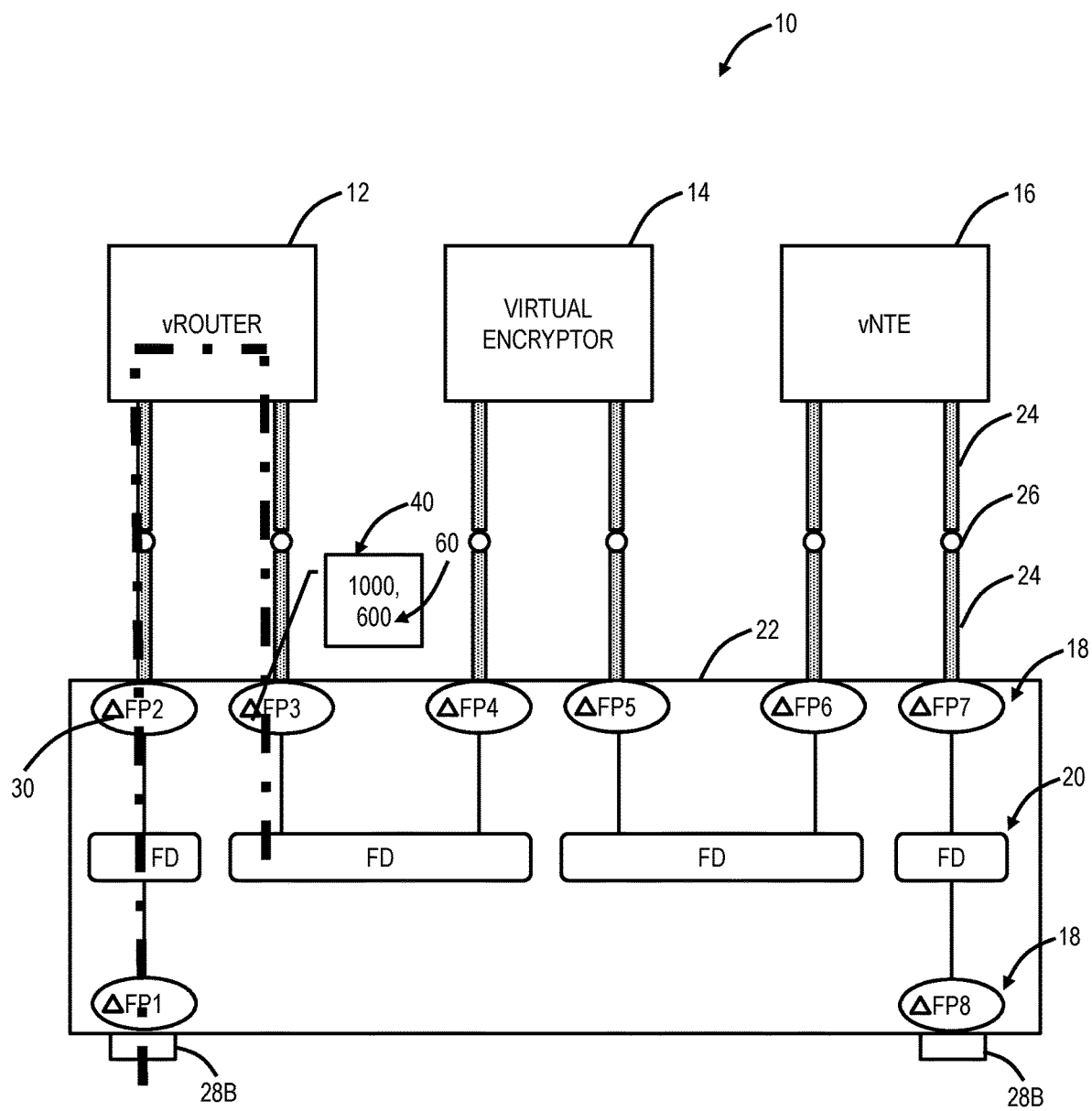
FIG. 3 is a network diagram of the SFC chain of FIG. 1 for describing the systems and methods of SFC fault isolation using a second reserved VLAN in accordance with the embodiment of the proposed solution.

FIG. 3 is a network diagram of the SFC 10 for describing the systems and methods of SFC fault isolation using a second reserved VLAN. Fault isolation is achieved by injecting a ROAM VLAN ID 60 tagged Ethernet frame 40 with appropriate header information at the entry point of any VNF 12, 14, 16. Once the frame is received at the end of the corresponding VNF 12, 14, 16 (or downstream therefrom), the software or higher layer controller is notified that (the health of) the corresponding VNF 12, 14, 16 is up and operational (in good health). Conversely, if the Ethernet frame 40 with the ROAM VLAN ID 60 is not received at the end of the corresponding VNF 12, 14, 16 (or downstream therefrom), any such potential fault can be isolated to this particular VNF 12, 14, 16 (or to a subsequent one thereof).

In the example of FIG. 3, the health of the vRouter VNF 12 is checked by injecting the Ethernet frame 40 with the ROAM VLAN ID 60 tag and a Layer 3 header at the FP1 18. The Ethernet frame 40 received at the FP3 18 confirms the health of the vRouter VNF 12 as good. If the FP3 18 does not receive the injected Ethernet frame 40, then that means there is a fault in the path via the vRouter VNF 12 and the software or higher layer controller is informed of this fault. In this manner, once connectivity verification fails using the ROAM VLAN ID 50, the ROAM VLAN ID 60 can be used to isolate any fault to a specific location. Further subsequent detected success or failure can be used for monitoring purposes to update the software or higher layer controller.

For Ethernet frames 40 with the ROAM VLAN ID 50, 60 tags, the vSwitch 22 or other network device is configured such that the classifier 30 understands these Ethernet frames 40 are connectivity check frames. The vSwitch 22 or other network device is configured to pass through such Ethernet frames 40 through VNFs 12, 14, 16 in SFC 10. Each VNF (e.g., the VNFs 12, 14, 16) is configured with appropriate configuration to allow the Ethernet frames 40, with the ROAM VLAN ID 50, 60 tags through the VNF. That is, the Ethernet frame 40 is not processed by the VNFs 12, 14, 16, but rather simply passed through based on the presence of the ROAM VLAN ID 50, 60 tags.

Of note, the FPs 18 are configured to detect the Ethernet frame 40 with either of the ROAM VLAN IDs 50, 60 and either the FP 18 correctly detects either of the ROAM VLAN IDs 50, 60 indicating proper connectivity or the FP 18 does not detect either of the ROAM VLAN IDs 50, 60 when expected and this absence indicates a problem with connectivity. Thus, the absence of an expected ROAM VLAN IDs 50, 60 indicates a loss of connectivity at the associated FP 18.

Also, the Ethernet frame 40 can be used to isolate the SFC 10 and there can be multiple SFCs through the all or some of the same physical equipment. Based on a potential connectivity on the SFC 10, the Ethernet frames 40 can be used on other SFCs to attempt to check their connectivity and verify the potential fault. Also, a loss of connectivity may require the absence of multiple Ethernet frames 40 on the same SFC 10, i.e., for verification as one single Ethernet frame 40 may be lost while connectivity still exists. Further, the Ethernet frame 40 can be continuously provided over the SFC 10, such as at a predetermined interval to continuously verify connectivity.

Figure 4:
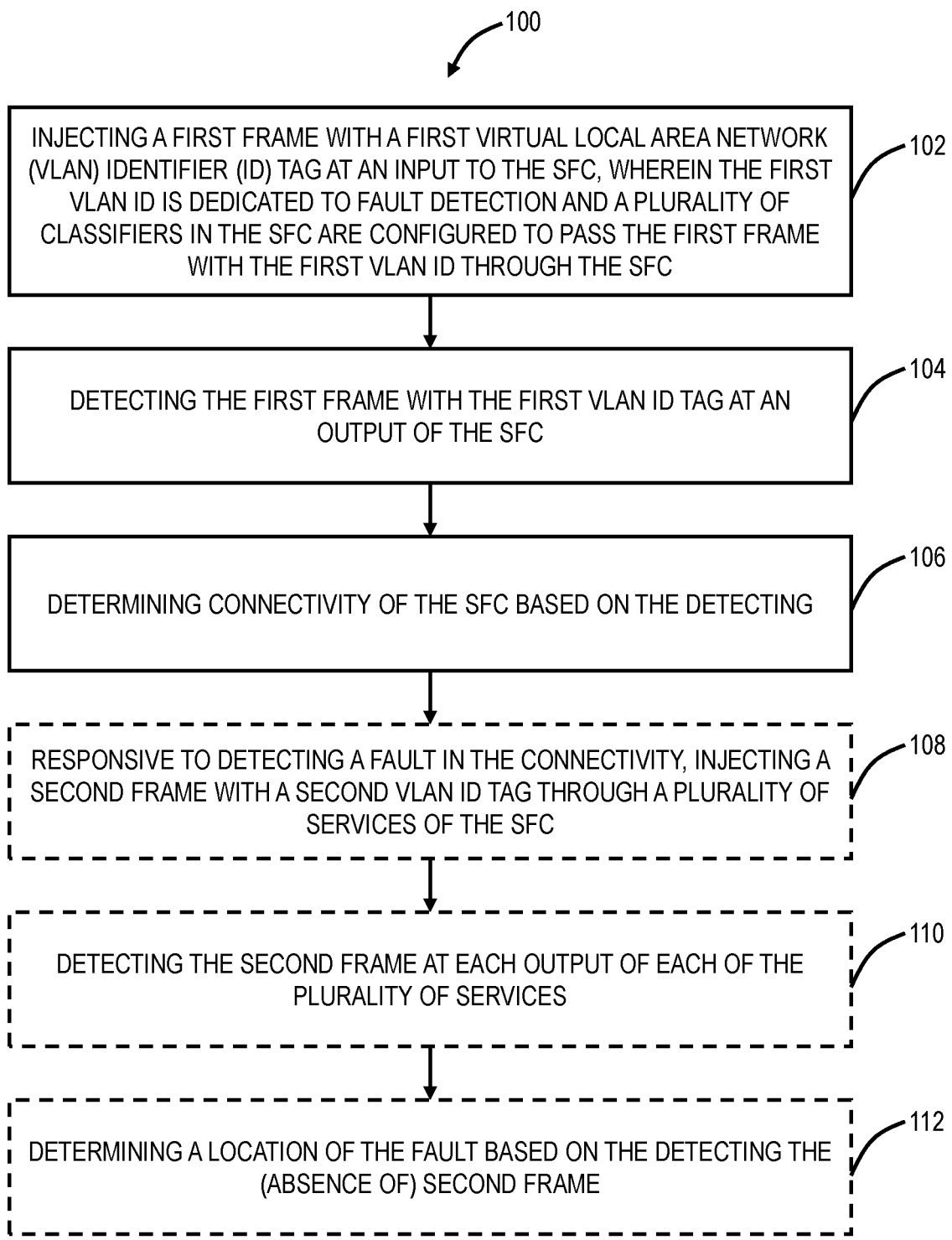
FIG. 4 is a flowchart which illustrates a process of Service Function Chaining (SFC) fault detection and fault isolation in accordance with the embodiment of the proposed solution.

FIG. 4 is a flowchart illustrating a process 100 of Service Function Chaining (SFC) fault detection and fault isolation.

The process 100 includes injecting a first frame with a first Virtual Local Area Network (VLAN) Identifier (ID) tag at an input to the SFC, wherein the first VLAN ID is dedicated for fault detection and a plurality of classifiers in the SFC are configured to pass the first frame with the first VLAN ID through the SFC (step 102); detecting the first frame with the first VLAN ID tag at an output of the SFC (step 104); and determining connectivity (open flow of frames) through the SFC based on the detecting (step 106).

The SFC can include a plurality of Flow Points each including one of the plurality of classifiers. The plurality of Flow Points can include a pair of end points at associated end points of the SFC and one or more intermediate points in the SFC. The first VLAN ID tag is not used for regular traffic classification. The determining (open flow of frames) connectivity can be reported to one of software and a higher layer controller. The SFC can include one or more Virtual Network Functions (VNFs). Each of the plurality of classifiers can be configured to pass the first frame through the one or more VNFs.

The process 100 can further include, responsive to detecting a fault in the connectivity (open flow of frames), injecting a second frame with a second VLAN ID tag through one of a plurality of services of the SFC (step 108); detecting the second frame at each output of each of the plurality of services (step 110); and determining a location of the fault based on the absence of (detecting) the second frame (step 112). Also, each of the plurality of classifiers can be configured to pass the second frame through the one or more VNFs. The second VLAN ID tag is not used for regular traffic classification.

In another embodiment, a system of Service Function Chaining (SFC) configured for fault detection and fault isolation includes a plurality of services interconnected in the SFC; wherein, to determine (flow of frames) connectivity of (through) the SFC, a first frame with a first Virtual Local Area Network (VLAN) Identifier (ID) tag is injected at an input to the SFC, wherein the first VLAN ID is dedicated to fault detection, and a plurality of classifiers in the SFC are configured to pass the first frame with the first VLAN ID through the SFC, and wherein the first frame with the first VLAN ID tag is detected at an output of the SFC, and wherein the (flow of frames) connectivity is determined based on detection of the first frame at the output.

In a further embodiment, an apparatus for Service Function Chaining (SFC) fault detection and fault isolation includes circuitry configured to inject a first frame with a first Virtual Local Area Network (VLAN) Identifier (ID) tag at an input to the SFC, wherein the first VLAN ID is dedicated to fault detection and a plurality of classifiers in the SFC are configured to pass the first frame with the first VLAN ID through the SFC; circuitry configured to detect the first frame with the first VLAN ID tag at an output of the SFC; and circuitry configured to determine (flow of frames) connectivity of the SFC based on the detecting.

Processing System

Figure 5:
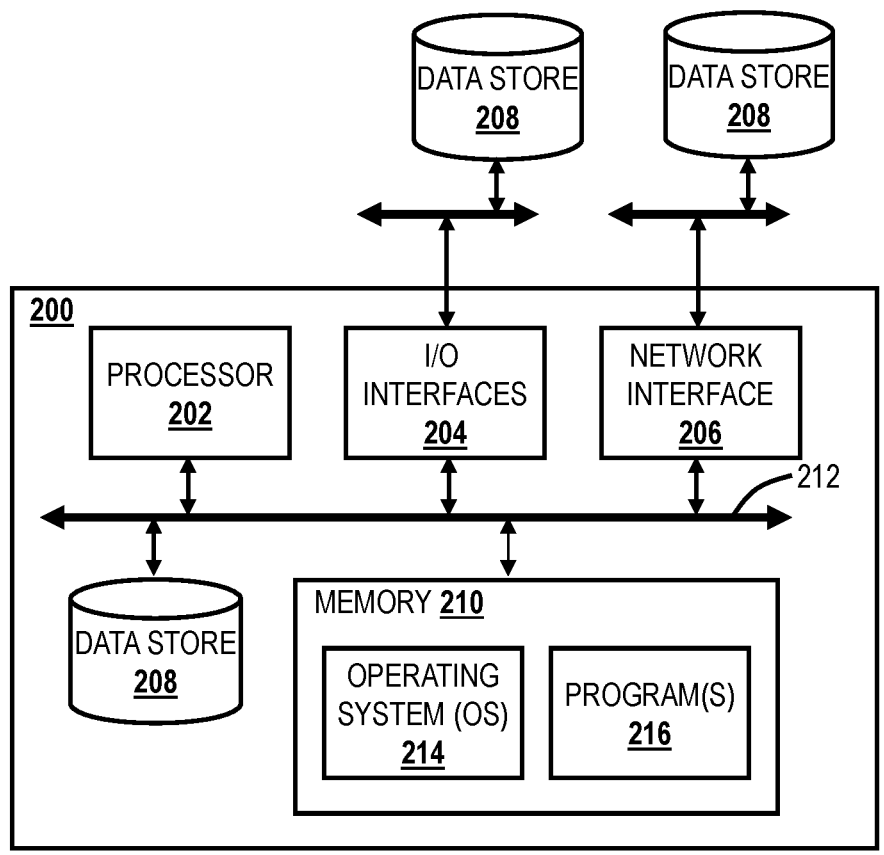
FIG. 5 is a block diagram of a processing system which may be used to implement the VNFs, the vSwitch, a higher level controller, etc. of the proposed solution.

FIG. 5 is a block diagram of a processing system 200 which may be used to implement the VNFs 12, 14, 16, the vSwitch 22, a higher level controller, etc. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the processing system 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the processing system 200, a semiconductor-based microprocessor (in the form of a microchip or chip set), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the processing system 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing system 200 such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

For example, while the proposed solution has been described with specific reference to VLAN ID tags, the invention is not limited to VLAN ID tags (alone). The functionality of the coded logic described herein can be implemented using any other frame tag(s) and/or identifiable injected frames. For example, one of fault detection and fault isolation can employ double frame tagging while the other can employ single frame tagging. For clarity, injected frame detection is not limited to header inspection. As another example, one of fault detection and fault isolation can employ one of Layer-2 and Layer-3 frame tagging while the other of fault detection and fault isolation can employ the other one of Layer-2 and Layer-3 frame tagging.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of Service Function Chaining (SFC) fault detection and fault isolation, the method comprising:
   injecting a first frame with a first Virtual Local Area Network (VLAN) Identifier (ID) tag at an input to the SFC, wherein the first VLAN ID is dedicated to note an associated frame is utilized solely for fault detection and not for regular traffic classification, wherein a plurality of classifiers in the SFC are configured to pass the first frame with the first VLAN ID through the SFC for connectivity such that each flow point in the SFC simply passes the first frame without processing or modification due to the presence of the first VLAN ID;
   one of detecting the first frame with the first VLAN ID tag at an output of the SFC and failing to detect the first frame at the output;
   one of determining connectivity of the SFC based on the detecting and determining a fault in the connectivity based on the failing,
   responsive to detecting the fault in the connectivity, injecting a second frame with a second VLAN ID tag through a plurality of services of the SFC;
   detecting the second frame at each output of each of the plurality of services; and
   determining a location of the fault based on an absence of the detecting the second frame at a specific flow point in the SFC.

2. The method of claim 1, wherein the SFC comprises a plurality of Flow Points each comprising one of the plurality of classifiers.

3. The method of claim 2, wherein the plurality of Flow Points comprise a pair of end points at associated end points of the SFC and one or more intermediate points in the SFC.

4. The method of claim 1, wherein the first VLAN ID tag is not used for regular traffic classification.

5. The method of claim 1, wherein the determining connectivity is reported to one of software and a higher layer controller.

6. The method of claim 1, wherein the SFC comprises one or more Virtual Network Functions (VNFs).

7. The method of claim 6, wherein each the plurality of classifiers are configured to pass the first frame through the one or more VNFs.

8. A system of Service Function Chaining (SFC) configured for fault detection and fault isolation, the system comprising:
   a plurality of services interconnected in the SFC;

wherein, to determine connectivity of the SFC, a first frame with a first Virtual Local Area Network (VLAN) Identifier (ID) tag is injected at an input to the SFC, wherein the first VLAN ID is dedicated to note an associated frame is utilized solely for fault detection and not for regular traffic classification, wherein a plurality of classifiers in the SFC are configured to pass the first frame with the first VLAN ID through the SFC for connectivity such that each flow point in the SFC simply passes the first frame without processing or modification due to the presence of the first VLAN ID, wherein the first frame with the first VLAN ID tag is one of detected and failed to be detected at an output of the SFC, and wherein the connectivity is one of determined based on detection of the first frame at the output and determined to have a fault based on failure to detect, wherein, to determine a location of the fault in the connectivity, a second frame with a second VLAN ID tag is injected through a plurality of services of the SFC, and wherein the second frame is detected at each output of each of the plurality of services, and wherein the location of the fault is determined based on lack of detection of the second frame at one of the plurality of services.

9. The system of claim 8, wherein the SFC comprises a plurality of Flow Points each comprising one of the plurality of classifiers.

10. The system of claim 9, wherein the plurality of Flow Points comprise a pair of end points at associated end points of the SFC and one or more intermediate points in the SFC.

11. The system of claim 8, wherein the first VLAN ID tag is not used for regular traffic classification.

12. The system of claim 8, wherein the determined connectivity is reported to one of software and a higher layer controller.

13. The system of claim 8, wherein the SFC comprises one or more Virtual Network Functions (VNFs).

14. The system of claim 13, wherein each the plurality of classifiers are configured to pass the first frame through the one or more VNFs.

15. An apparatus for Service Function Chaining (SFC) fault detection and fault isolation, the apparatus comprising:
circuitry configured to inject a first frame with a first Virtual Local Area Network (VLAN) Identifier (ID) tag at an input to the SFC, wherein the first VLAN ID is dedicated to note an associated frame is utilized solely for fault detection and not for regular traffic classification, wherein a plurality of classifiers in the SFC are configured to pass the first frame with the first VLAN ID through the SFC for connectivity such that each flow point in the SFC simply passes the first frame without processing or modification due to the presence of the first VLAN ID;
circuitry configured to one of detect the first frame with the first VLAN ID tag at an output of the SFC and fail to detect the first frame at the output;
circuitry configured to one of determine connectivity of the SFC based on the detection of the first frame and determine a fault based on failure to detect the first frame;
circuitry configured to inject a second frame with a second VLAN ID tag through a plurality of services of the SFC responsive to detecting the fault in the connectivity;
circuitry configured to detect the second frame at each output of each of the plurality of services; and
circuitry configured to determine a location of the fault based on lack of detecting the second frame at a specific flow point in the SFC.

16. The apparatus of claim 15, wherein the SFC comprises one or more Virtual Network Functions (VNFs).

17. The apparatus of claim 16, wherein each the plurality of classifiers are configured to pass the first frame through the one or more VNFs.

* * * * *